(12) United States Patent
Rohit et al.

(10) Patent No.: US 7,877,360 B2
(45) Date of Patent: Jan. 25, 2011

(54) RECOVERY POINT IDENTIFICATION IN CDP ENVIRONMENTS

(75) Inventors: Jain Rohit, Domlur 2ND Stage (IN); Ramani R. Routray, San Jose, CA (US); Akshat Verma, New Delhi (IN); Kaladhar Voruganti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 12/014,120

(22) Filed: Jan. 15, 2008

(65) Prior Publication Data

US 2009/0182784 A1 Jul. 16, 2009

(51) Int. Cl.
*G06F 7/00* (2006.01)
(52) U.S. Cl. ............................ 707/648; 707/682
(58) Field of Classification Search ............... 707/999.2, 707/999.201, 999.202, 999.203, 999.204, 707/648, 682
See application file for complete search history.

(56) References Cited

U.S. PATENT DOCUMENTS

| | | | |
|---|---|---|---|
| 6,678,704 | B1 | 1/2004 | Bridge, Jr. et al. |
| 7,467,165 | B2* | 12/2008 | Okada et al. ........... 707/999.202 |
| 2006/0101384 | A1 | 5/2006 | Sim-Tang et al. |
| 2006/0168473 | A1 | 7/2006 | Sahoo et al. |
| 2007/0100879 | A1* | 5/2007 | Dawson et al. .......... 707/103 X |
| 2007/0179994 | A1* | 8/2007 | Deguchi et al. ............. 707/202 |

OTHER PUBLICATIONS

DB2 Universal Database—High Availability Disaster Recovery (HADR). At www.ibm.com/software/data/db2/udb/hadr/html.
DMTF-CIM. At www.dmtf.org/standards/cim/.
EMC SRDF Family. At http://www.emc.com/products/networking/srdf.jsp.
M. D. Flouris and A. Bilas. Clotho: Transparent data versioning at the block I/O level. In *Proceedings of NASA/IEEE Conference on Mass Storage and Technologies*, 2004.
J. L. Hafner, V. Deenadhayalan, K. K. Rao and J. A. Tomlin. Matrix Methods for Lost Data Reconstruction in Erasure Codes. In *USENIX Conference on File and Storage Technologies*, FAST 2005.
IBM General Parallel File System. At http://www-03.ibm.com/systems/clusters/software/gpfs.html.

(Continued)

*Primary Examiner*—Hosain T Alam
*Assistant Examiner*—Amy Ng
(74) *Attorney, Agent, or Firm*—Gibb I.P. Law Firm, LLC; Derek S. Jennings

(57) ABSTRACT

The embodiments of the invention provide a method of identifying a recovery point in a continuous data protection (CDP) log. More specifically, the method begins by detecting corrupted data in the CDP log and identifying the nature of corruption. Next, the nature of corruption is mapped to applications to identify components that may have caused the corrupted data. The method then finds a time instance of uncorrupted data in the components. Specifically, this can include searching CDP log entries in an order independent of log event age. Alternatively, the process of finding the time instance can include creating a data image of a first copy of uncorrupted data and sequentially apply entries of the CDP log until the corrupted data is reached.

20 Claims, 6 Drawing Sheets

OTHER PUBLICATIONS

K. Keeton, C. Santos, D. Beyer, J. Chase, and J. Wilkes. Designing for disasters. In *n Thrid Usenix Conference on File and Storage Technologies (FAST2004)*, 2004.

E. Kiciman and A. Fox. Detecting Application-Level Failures in Component-based Internet Services. In *IEEE Transactions on Neural Networks: Special Issue on Adaptive Learning Systems in Communication Networks (invited paper)*, Spring 2005.

A. Kochut and G. Kar. Managing Virtual Storage Systems: An Approach Using Dependency Analysis. In *IFIP/IEEE Eighth International Symposium on Integrated Network Management(IM 2003)*, 2003, Colorado Springs, USA.

Mendocino Software. http://www.mendocinosoft.com.

Online survey results: 2001 cost of downtime. Eagle Rock Alliance Ltd, Aug. 2001. At http://contingencyplanningresearch.com/2001 Survey.pdf.

Open Source Rule Engines in Java. At http://javasource.net/open-source/rule-engines.

A. Pennington, J. Strunk, J. Griffin, C. Soules, G. Goodson, and G. Ganger. Storage-based Intrusion Detection: Watching Storage Activity For Suspicious Behavior. In *12th USENIX Security Symposium*, 2003.

K. M. Reddy, C. P. Wright, A. Himmer, and E. Zadok. A Versatile and User-Oriented Versioning File System. In *USENIX Conf. on File And Storage Technologies*, FAST 2004.

http://www.revivio.com.

D. Agrawal, J. Giles, K. Lee, K. Voruganti, K. Filali-Adib. Policy-Based Validation of SAN Configuration. In *Proceedings of IEEE Policy 2004*, Yorktown Heights, NY, Jun. 2004.

M. Banikazemi, D. Poff and B. Abali. Storage-Based Intrusion Detection for Storage Area Networks (SANs). In *22nd IEEE/13th NASA Goddard Conference on Mass Storage Systems and Technologies (MSST 2005)*, 2005.

M. Chen, A. Zheng, J. Lloyd, M. Jordan, and E. Brewer. A Statistical Learning Approach to Failure Diagnosis. In *International Conference on Autonomic Computing (ICAC)*, New York, NY, May 2004.

SAP R/3 FAQ—ABAP/4 Dictionary. www.sappoint.com/faq/faqabdic.pdf.

Self-Monitoring, Analysis and Reporting Technology (SMART)disk drive monitoring tools. At http://sourceforge.net/projects/smartmontools/.

Storage Networking Industry Association. An overview of today's Continuous Data Protection (CDP) solutions. At http://www.snia.org/tech activities/dmf/docs/CDP Buyers Guide 20050822.pdf.

C. Soules, G. Goodson, J. Strunk and G. Ganger. Metadata efficiency in versioning file systems. In *Second Usenix Conference on File and Storage Technologies, (FAST 2003)*, San Francisco, USA, 2003.

IBM Tivoli Continuous Data Protection for Files. www-306.ibm.com/software/tivoli/products/continuous-dataprotection/.

Veritas Volume Replicator. At www.symantec.com.

Virus Encyclopedia. At http://www.viruslist.com/viruses/encyclopedia.

XOsoft Backup and Recovery Solution. At http://www.xosoft.com.

W. Xu, P. Bodik, D. Patterson. A Flexible Architecture for Statistical Learning and Data Mining from System Log Streams. In *Workshop on Temporal Data Mining: Algorithms, Theory and Applications at the Fourth IEEE International Conference on Data Mining (ICDM'04)*, Brighton, UK, Nov. 2004.

A. Whitaker, R. Cox and S. Gribble. Configuration Debugging as Search: Finding the Needle in the Haystack. In OSDI, 2004.

\* cited by examiner

RECOVERY POINT IDENTIFICATION IN CDP ENVIRONMENTS

BACKGROUND

1. Field of the Invention

The embodiments of the invention relate to recovery point identification in continuous data protection (CDP) environments.

2. Description of the Related Art

When identifying a data corruption problem, users find that a latest copy of data has been corrupted by some element, such as a virus attack, or a malfunctioning storage controller or disk. In cases of data corruption, a clean copy of the most current data must be retrieved. However, the recovery time is dependent on how quickly the most current clean copy of data can be identified and retrieved.

Data protection can be achieved by taking continuous or periodic snapshots of the data as it is being updated. Block level, file level, logical volume level, and database level data replication/recovery mechanisms are prominent data protection mechanisms.

Such data protection mechanisms vary with respect to their support for different data granularities, transactional support, replication site distance, backup latencies, recovery point, and recovery time objectives. Continuous data protection (CDP) is a form of continuous data protection that allows users to go back and recover earlier versions of a data object at the granularity of a single update.

SUMMARY

The embodiments of the invention provide a method of identifying a recovery point in a CDP log. More specifically, the method begins by detecting corrupted data in the CDP log and identifying the nature of corruption. Next, the nature of corruption is mapped to applications to identify components that may have caused the corrupted data.

The method then finds a time instance of uncorrupted data in the components. Specifically, this can include searching CDP log entries in an order independent of log event age. Alternatively, the process of finding the time instance can include creating a data image of a first copy of uncorrupted data and sequentially apply entries of the CDP log until the corrupted data is reached.

The method can further compute, for each CDP log entry, a probability that a corruption event that caused the corrupted data occurred near the CDP log entry relative to other CPD log entries. The probability is attached to the CDP log entry. Moreover, the process of attaching the probability can include obtaining information of data corruption events from an independent entity, such that the information is independent of specific system applications. Thus, the process of finding the time instance can include searching CDP log entries having a higher probability of occurring near a corruption event before searching CDP log entries having a lower probability of occurring near the corruption event.

In addition, the process of finding the time instance can divide the CDP log into a first group, a middle log event, and a second group. The first group has log entries that are older than the middle log event; and, the second group has log entries that are newer than the middle log event. This process of dividing the CDP log can identify a CDP log event positioned between the first group and the second group, such that the first group has an equal size as the second group.

Further, selected CDP log entries are identified by selecting a first predetermined amount of CDP log entries that occur before a CDP log event that is positioned between the first group and the second group, and by selecting second predetermined amount of the CDP log entries that occur after a CDP log event that is positioned between the first group and the second group. The dividing of the CDP log also identifies which one of the selected CDP log entries has the highest probability of occurring near the corruption event. This CDP log entry having the highest probability is designated as the middle log event.

Following this, the method determines if the middle log event has the corrupted data. If the middle log event has the corrupted data, the first group is searched. If the middle log event does not have the corrupted data, the second group is searched. Subsequently, the uncorrupted data is output using the CDP log and point-in-time images which are used to construct the uncorrupted data.

Accordingly, the embodiments of the invention provide an architecture and data scanning methods that quickly identify clean copies of data. The architecture and methods are compatible with existing CDP solutions and are extensible because they allow different applications to customize the process of identifying corrupt data. Moreover, the embodiments herein allow system administrators to decide on the trade-off between data currentness and overall recovery time. By incorporating the architecture and methods into existing CDP solutions, system administrators can cut down the overall recovery time by quickly identifying a clean copy of data. The embodiments herein can reduce the overall recovery time by many orders of magnitude.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF EMBODIMENTS

Figure 1:
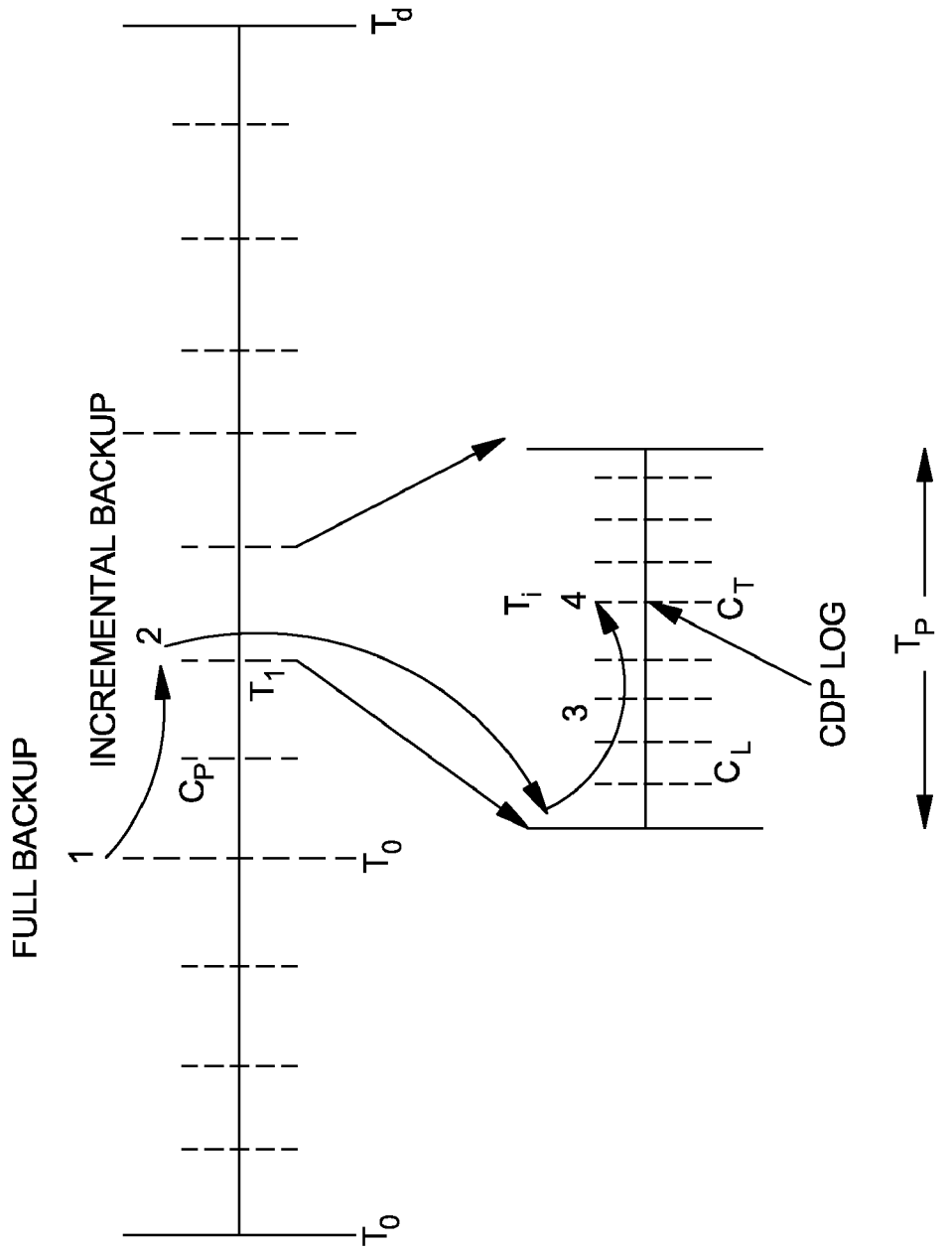
FIG. 1 is a diagram illustrating a recovery point identification strategy.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

The embodiments of the invention provide methods for efficient recovery point identification in CDP logs. Specifically, the methods evaluate events generated by various components (e.g., applications, file systems, databases and other hardware/software resources) and generate checkpoint records. Subsequently, upon the detection of a failure, the checkpoint records are efficiently processed to start the recovery processing from an appropriate CDP record.

The embodiments of the invention present the architecture of an extensible recovery point identification tool that performs event monitoring, checkpoint generation and indexing, query processing, and CDP log processing. The architectural framework is independent of specific applications and can be utilized with other application specific CDP solutions. Upon detecting a problem/failure, the system administrator can determine a suitable recovery point for restoring data that meets the recovery time and data currency constraints of the applications.

Typically, data corruptions are not silent; rather, they are accompanied by alerts and warning messages from applications, file systems, operating systems, storage area network elements (e.g., switches and virtualization engines), and storage controllers and disks. TABLE 1 lists events that usually accompany corruptions caused by various components. The embodiments herein define a mechanism that identifies and checkpoints events from various application and system logs that are likely to be correlated to different types of data corruptions. The event checkpointing mechanism uses administrator defined event signatures for different types of corruption inducing failures in Bayesian learning on the event stream to assign a correlation probability to each event.

The embodiments of the invention present three different CDP log processing methods that efficiently process the event checkpoints for identifying the appropriate CDP log record for data recovery. The methods use the failure correlation probability associated with events to quickly isolate the region in the CDP log where corruption inducing failure occurred. The CDP log processing methods provide a tradeoff between the total execution time and the data currentness (how current the data is) at the recovery point. The expected execution time of the methods is logarithmic in the number of checkpoint records examined and the number of data versions tested for data integrity.

With embodiments herein, data corruption is detected by an integrity checker (e.g., with application support). Next, the process identifies the nature of corruption (e.g., virus corruption, hardware error). For isolating the problem, the components (e.g., controllers, disks, switches, applications) that may be the cause of error are identified by constructing a mapping from the corrupted data to the applications. Once the affected components are identified, the recovery module finds a time instance to go back to when the data was uncorrupted. Once the time instance is identified, CDP logs and point-in-time images are used to construct the uncorrupted data.

The problem of recovery point identification is described using the following notation and constructs. Let $T_d$ be the time at which an integrity checker detected that some data was corrupt and $T_0$ be the time at which the data was last known to be clean (e.g., because the integrity checker was last run at $T_0$). Given a recovery time constraint $D_{rec}$ and the actual time of error $T_e$, the data recovery solution herein finds a timestamp $T_i$ within $D_{rec}$ time, such that the loss in data currency $T_e - T_i$ is minimized. A variant of the solution herein minimizes the total time taken to recover the data in order to get the most current uncorrupted data (i.e., minimize $D_{rec}$ such that $T_e = T_i$).

The additional following notations are utilized herein: N is the length of the CDP logs that are being monitored; and, $T_p$ is the number of CDP logs after which a point-in-time copy (also referred to herein as "pit copy") is taken. Further, $C_p$ is the cost of getting a pit copy online and ready to read/write; $C_l$ is the average cost of applying one CDP log entry; and, $C_t$ is the cost of testing one data image for corruption.

The solution of recovery point identification herein finds an ordered set S of timestamps, which is a subset of the set of all the timestamps ($T_0, \ldots, T_N$), such that $S_m(m=|S|)$. The last element of the set S is the same as the error point $T_e$. Further, the total cost of creating and testing the data images corresponding to the m timestamps in S is minimized with embodiments herein. The cost of checking a data image at timestamp $T_i$ for corruption is the sum of (a) the cost of making the first

TABLE 1

| Event Type | Affected Components | Corruption Type |
|---|---|---|
| Storage Device Events | | |
| LUN Making Change | LUNs Involved | Application Data Overwrite |
| Controller Firmware Upgrade | All LUNs on Controller | Large Footprint Corruption |
| S.M.A.R.T. Message | RAID Array | Loss of Sector Data |
| Disk Scrubbing | RAID Array | Detects Sector/Bit Level Corruption |
| Env. Threshold Alert | RAID Array | Random Bit Errors |
| Host Events | | |
| Virus Scan | Scanned Filed | Detects Logical Data Corruption |
| File System Check (fsck) Utility | File System | Detects Logical Data Corruption |
| OS Upgrade Patch | Specific Files | Config. Data Corruption |
| Writes to System Config. Dir. w/o App. Install | Logical Volumes | Indicates Virus |
| Unusual Network Activity on Ports > 1080 | Machines on Network | Indicates Virus |
| High CPU and I/O Activity | Logical Volumes | Indicates Virus (in conjunction with above two) |
| Change in Access Rights or Passwords | Logical Volumes, Other Hosts | Indicates Virus |
| Application Events | | |
| Application Install Upgrade | Specific Files Directories | App. Data Overwrite | pit image preceding the timestamp available for read/write ($C_p$), (b) the cost of applying the $T_i$ % $T_p$ ($T_i$ modulo $T_p$) CDP logs ($C_l(T_i$ % $T_p$)), and (c) the cost of testing the copy ($C_t$). Hence, the total time spent in isolating the uncorrupted copy is the sum of the costs of all the timestamps checked in the sequence S.

FIG. 1 illustrates an exemplary recovery point identification strategy, wherein the data image is checked at $T_i$ for corruption. The data protection (continuous and point-in-time) solution employed in the setting takes a total backup of the data at regular intervals. In between total backups, incremental backups are taken after every $T_p$ writes (CDP logs). The number of incremental backups taken between two consecutive total backups is denoted by $f_r$. Hence, in order to construct the point-in-time snapshot of data at time $T_i$, the first total backup copy preceding $T_i$ (labeled as $T_b$ in the example) is made online as shown by arrow 1. Then, incremental backups are applied over this data until the timestamp $T_f$ of the last incremental backup point before $T_i$ is reached as shown by arrow 2. The total time taken in getting the point-in-time copy (pit copy) at $T_f$ online is denoted by $C_p$. On this pit copy, the CDP logs are applied that capture all the data changes made between $T_i$ and $T_f$, and incur a cost of $C_l$ for each log as shown by arrow 3. Finally, an integrity check is applied over this data, and the running time of the integrity checker is denoted by $C_t$ as shown by arrow 4.

For average metadata, a write coalescing factor of $W_{ef}$ and an average filesize of $E(S_f)$ are utilized. For data write sizes of $E(S_m)$ and $E(S_w)$, read and write bandwidths of $B_r$ and $B_w$ are utilized, respectively. For a file corpus of $N_f$ files and a unit integrity test time of $I_t$, the expected time taken for each of these activities is given by the following equations.

$$C_p = \frac{(f_I/2)(T_p/W_{ef})E(S_m)}{B_w} \quad (1)$$

$$C_l(T_i \% T_p) = \frac{(T_p/2)E(S_w)}{B_w} \quad (2)$$

$$C_t = \frac{N_f E(S_f)}{B_r}, N_f E(S_f) I_t \quad (3)$$

Equation (1) is based on the assumption that only metadata is changed to point to the appropriate data blocks for constructing the pit copy. In a storage environment, assuming 1000 files are modified every second, with update sizes of 4 KB, file sizes of 10 KB, metadata sizes of 64 Bytes, total backups every 12 hours, incremental backups every 1 hr, and a disk transfer rate of 100 Mbps, the time taken to get a pit image online is approximately 50 seconds. The time taken to apply the CDP logs is of the order of 10 minutes, whereas the input/output (I/O) time taken (not including any computations) by the integrity checker is approximately 4 hours (assuming that the integrity checker only needs to check the files that have been modified). Hence, minimizing the time taken by the recovery process involves minimizing the number of data images that are checked by the recovery process.

Instead of requiring an administrator to define application-dependent events and manually correlating them with failures (and automating the process of identifying such checkpoints), events are captured from various monitoring sources in an application-independent manner. Hence, the events $e_i$ related to corruption failure $c_j$ are checkpointed. Expert information on failures (also referred to herein as "information of data corruption events from an independent entity") is utilized to attach probabilities $p_{i,j}$ with each of these checkpoint records, where $p_{i,j}$ denotes the probability that the corruption $c_j$ happened around the same time as $e_i$ (assuming that a corruption $c_j$ has actually occurred). Hence, the checkpoint records capture information on the checkpoints that are more likely to have caused the corruption. The point of corruption is quickly converged upon because pruning the space of timestamps into two equal sized partitions reduces the space quickly. Moreover, checkpoint records with a high $p_{i,j}$ have a higher probability of having caused the error; and hence, the rate of convergence is increased.

Figure 2:
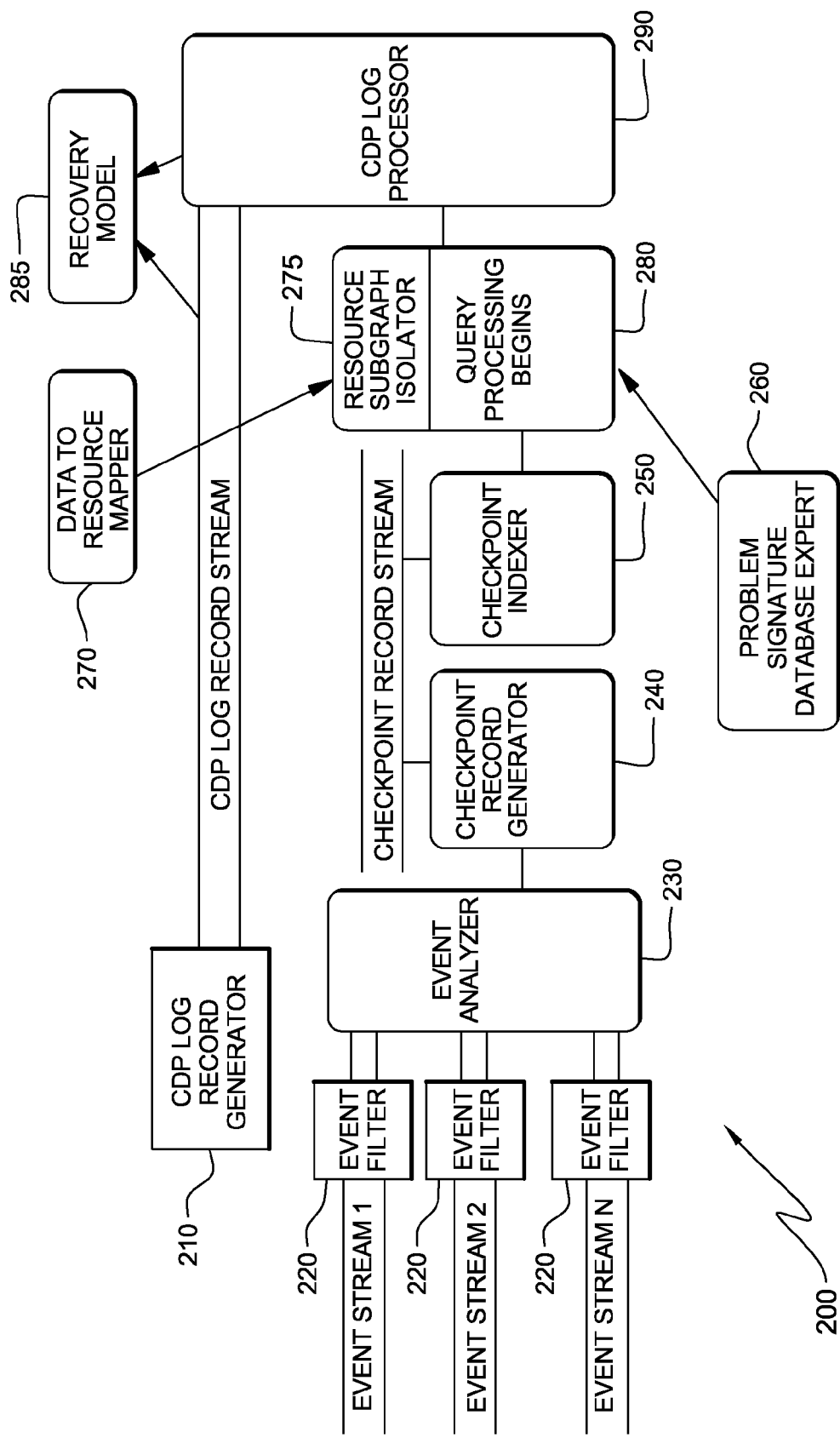
FIG. 2 is a diagram illustrating a checkpoint-based recovery point identification architecture.

As shown in FIG. 2, the system architecture 200 comprises a CDP log/record generator 210, an event filters 220, an event analyzer 230, a checkpoint record generator 240, a checkpoint indexer 250, a problem signature database/expert 260, a data to resource mapper 270, a resource subgraph isolator 275, a checkpoint store and query processing engine 280, a recovery module 285, and a CDP log processor 290. With regards to the CDP log/record generator 200, CDP data can be generated as either incremental log records or as complete image snapshots. Policies may be chosen that operate the system in incremental record generation mode with periodic (e.g., weekly, monthly, etc.) complete snapshots. Policies can also be selected that can control whether a copy is created when a write operation is performed, or if a plurality of writes are aggregated and a single incremental log record is generated. The checkpoint record architecture 200 can be utilized with any CDP implementation that provides a mechanism for querying the instantaneous CDP log sequence number or a timestamp for synchronizing with the checkpoint records.

The event filters 220 are used by application deployers and administrators to monitor the events generated and to select the events to be monitored and checkpointed. The filtered events are sent to the event analyzer 230, which collects events from all applications. The event analyzer 230 employs user specified polices and statistical methods to attach to the events their respective probability of being associated with a data corruption.

Once the event analyzer 230 determines that an event is relevant, the event is passed to the checkpoint record generator 240. The checkpoint records have fixed event independent fields and a character large object (CLOB) field that stores event dependent information.

The checkpoint store is used to persist checkpoint records for efficient search and retrieval during a subsequent recovery process. The input to the query processing engine 250 is a search engine type query; and, the output is a set of checkpoint records that point to the appropriate CDP data that might contain uncorrupted data.

Once the query processing engine 250 returns the checkpoint records that have high probabilities of being associated with the observed corruption, the CDP log processor 250 examines the checkpoint records and the associated CDP log records to determine the most suitable candidates that should be used for recovery purposes. The records can be scanned in many different ways, e.g., sequentially, binary search, etc. The CDP log processor 250 takes user specified processing time limits as an input parameter. For example, users may be willing to compromise on the currentness of the recovered data in order to finish the recovery task within a specified time window.

When data corruption is detected (e.g., through application or user support), the following steps are followed for recovering the data to an uncorrupt state. The first step is to narrow down the scope of recovery by identifying the type of data corruption that may have occurred. Often, the data integrity checker tools point to the type of corruption. For example, corruption at the block or sector level, which is detected by a disk scrubber tool, rules out a corruption caused at the logical data level. Thus, only hardware device related failures are left for consideration. Virus scanners are often able to identify the exact virus that has affected a system. This allows the tools herein to focus on event patterns that are indicative of virus infiltration. Further, corruption caused by operator errors, which results in sharing violations, are characterized by the occurrence of incorrect data. However, such incorrect data is distinguishable from semantically meaningless data.

Next, the components involved in the corruption path are identified. Specifically, the logical data stores used by the application are determined from the various configuration files used to configure and deploy the application. For example, SAP™ software (available from SAP™ USA located in Newtown Square, Pa., USA) has a data dictionary that provides a mapping for SAP™ data objects. The logical data stores are mapped to physical storage volumes hosted by storage devices on the SAN. The components (e.g., host bus adapter switches, virtualization appliances, and storage controllers) in the path from the logical stores to the physical volumes are also determined. Service location protocol can be used to discover common information model object managers (CIMOMs) for those devices that support the protocol. The standard CIM data model is supported by most vendors to provide information about the devices and their relationships with each other.

The above steps are used to narrow the set of applicable checkpoint records for processing by the CDP log processing methods. Depending on the operating environment and the desired tradeoff between recovery time and data currentness, a CDP log processing method can be used to determine a suitable point in the CDP log stream for rollback. Several intermediate steps can be carried out in the execution of the CDP log processing methods. These steps can include: a) constructing intermediate data images from CDP log replay with full and incremental backups; and, b) checking the integrity of the intermediate data images at points identified by the method.

Figure 3:
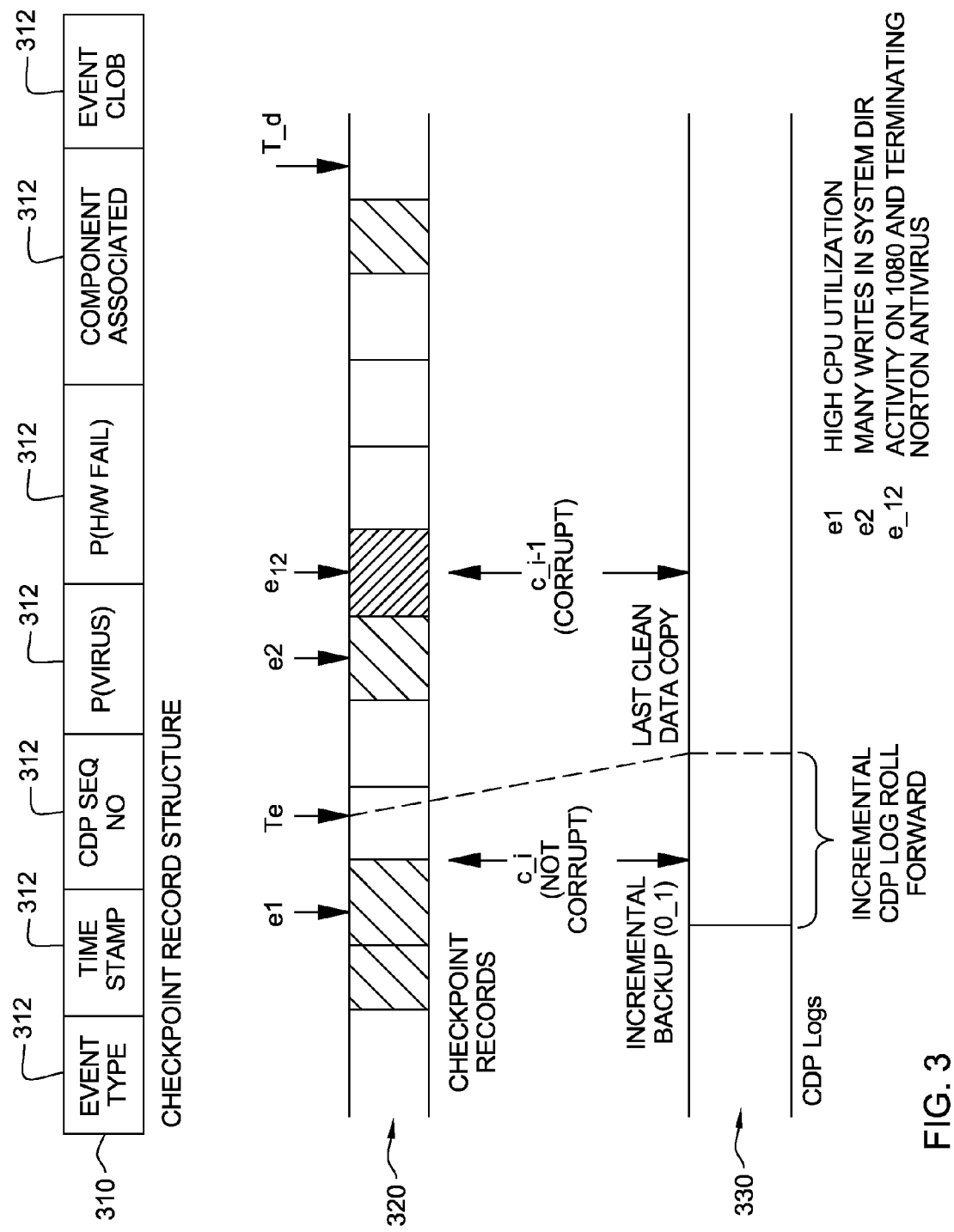
FIG. 3 is a diagram illustrating a recovery flow example.

FIG. 3 illustrates exemplary applications and systems that are monitored for events (a subset is shown in Table 1) that are symptomatic of different types of corruption inducing problems. The checkpoint record structure 310 has fields 312 for the correlation probability of an event with different types of corruption. The fields 312 can include the event type, time stamp, CDP sequence number, P(virus), P(h/w fail), component associated, and event character large object (CLOB). The event analyzer also creates checkpoints in the checkpoint records 320 for composite events, such as 'activity on port $\geq 1080$' and 'creation of small size files in system 32' within 5 minutes of each other. These checkpoints are defined based on administrator input and by employing statistical learning methods on historical event data.

For example, a virus scanner receives updated virus definitions and determines, at time $T_d$, that the system has been affected by a virus. The virus opens port 1080, terminates anti-virus processes, writes small files in system folders, sends large number of mails, and deletes existing files. Of these events, listening on port 1080 and terminating anti-virus processes are rare events. Such rare events receive a high correlation probability in the checkpoint records; whereas, the other events receive a low correlation probability. $T_e$ denotes the time when data is corrupted.

The recovery steps are executed as follows. First, the set of checkpoint records to be processed from the checkpoint records 320 is narrowed to those that have a non-zero probability for virus corruption type. Narrowing the checkpoint records 320 rules out events related to other corruption types, for example, those events related to software and hardware changes. Second, the possible set of corrupted data objects is narrowed down to those that were hosted on logical unit numbers (LUNs) and exposed by LUN mapping to the compromised machine. Both of the above steps utilize the checkpoint index to efficiently retrieve relevant records. By considering events from only the relevant components that are related to the observed corruption, the problem size for CDP log processing is substantially reduced. Subsequently, the CDP log processing methods operate on the selected checkpoint records and CDP log records from the CDP logs 330 associated with the affected LUNs. The low number of high probability events in the checkpoint records 320, such as $e_{12}$ in FIG. 3, quickly leads to the most recent checkpoint record $c_i$ where the data is not corrupted. Next, the exact point in the CDP logs 330 is located by loading the last incremental backup $b_i$ before $c_i$, and applying the incremental CDP logs until the first corrupted CDP log appears. This backup is the last data image that is free from corruption.

The event analyzer 230 performs two main tasks. The first task is to create checkpoint records of relevance from the large number of events that the system generates. The event analyzer uses an application specific filter that the application deployers and system administrators can use to filter out events that are not considered relevant for corruption isolation problems. Filtration at this stage reduces the load on other components in the CDP system. The systems generating the events are assumed to be synchronized in time to within a few milliseconds, thereby allowing the event timestamps to be used for sequencing. Table 1 illustrates common events, the components that the events are associated with, and the type of data corruption that the events may result in or are indicative of. In addition, applications can specify events that can help in the subsequent recovery process. Events are also listed, such as successful virus scans and disk scrubs, that denote the absence of corruption. These events can be used to reduce the checkpoint records to be examined during the recovery process. While the list of events is not meant to be exhaustive, a person having ordinary skill within the art would recognize from the list that corruption can result from errors anywhere from the application layer to the disk level.

The second task of the event analyzer 230 determines which events are more likely to be correlated with the data corruption. To perform this analysis, the event analyzer can use different methods of the embodiments herein to identify events that may be indicative of data corruption. For example, an expert can specify policies to associate priorities with events. A method is provided that uses statistical inferencing techniques to associate the probability of data corruption with events. For each event $e_i$ and each corruption type $c_j$, the probability $P(c_j/e_i)$ that the corruption was caused around the same time as the event is determined using Bayesian learning.

$$P(c_j/e_i)=(P(e_i/c_j).P(c_j))/P(e_i) \qquad (4)$$

The probabilities in Equation 4 are learned since the data corruption events occur very rarely. Anecdotal evidence may suggest that half of the hardware related to data corruption is associated with firmware upgrades. This suggests a value P (e :firmware upgrade/c :hardware corruption) of 0.5. Similarly, a virus signature in terms of the typical activities that a virus performs on an infected system can provide the conditional probabilities for events related to those activities. If this evidence is not available or does not favor a particular event, the probability of an event can be taken as inversely proportional to its frequency. Thus, a rarer event is more likely indicative of a corruption. However, since the probability of a corruption is very small, an anticipatory data integrity check may not be advantageous considering the significant resources needed.

The checkpoint record store captures the relevant events associated with various corruption problems experienced by the CDP-enabled storage system. A CDP checkpoint record processing system is governed by a different set of requirements. First, the event types that are monitored and logged are far fewer in number and by their very nature occur very infrequently compared to performance monitoring events. Second, the CDP recovery mechanism is invoked after a corruption has occurred. Thus, the checkpoint record query and analysis may be performed off-line. Accordingly, traditional relational database storage can be well suited for checkpoint record storage. Furthermore, the checkpoint records can be persisted for at least as long as the CDP log records. Once CDP logs for an interval are expired, usually after performing an integrity check and copying to a backup medium, the checkpoint records are also likely to be expired. However, it may be useful to retain certain checkpoints for a longer duration, such as those associated with high data corruption probability events. Such events can be used to speed up the recovery process in cases where corruption is detected much after its occurrence.

The query processing engine 280 is used primarily by the log processor 290 to select a subset of checkpoint records that are likely to be associated with the data corruption incident. The query process can be carried out in two parts. First, the checkpoint records are queried based on an event independent field, the probability of the event being associated with a particular corruption type, and the subsystem that the event originated from. For a faster query response time, standard indexing structures such as B-Trees can be maintained. A B-tree is a tree data structure that keeps data sorted and allows searches, insertions, and deletions in logarithmic amortized time. Next, within each event type, the records can be queried using a query engine according to the CLOB representation. For example, if the event dependent data is stored as XML, then XQuery is used to query the records.

Log processing methods are presented that utilize the checkpoint record based architecture to quickly create a clean copy of data. N denotes the number of CDP logs, $C_t$ is the cost of testing a data image for corruption, $C_p$ is the cost of getting a pit copy online, $C_p$ is the cost of applying one CDP log on a data image, and $T_p$ is the number of CDP logs after which a pit image is taken. Additionally, $N_c$ denotes the number of checkpoint records in the relevant history.

Figure 4:
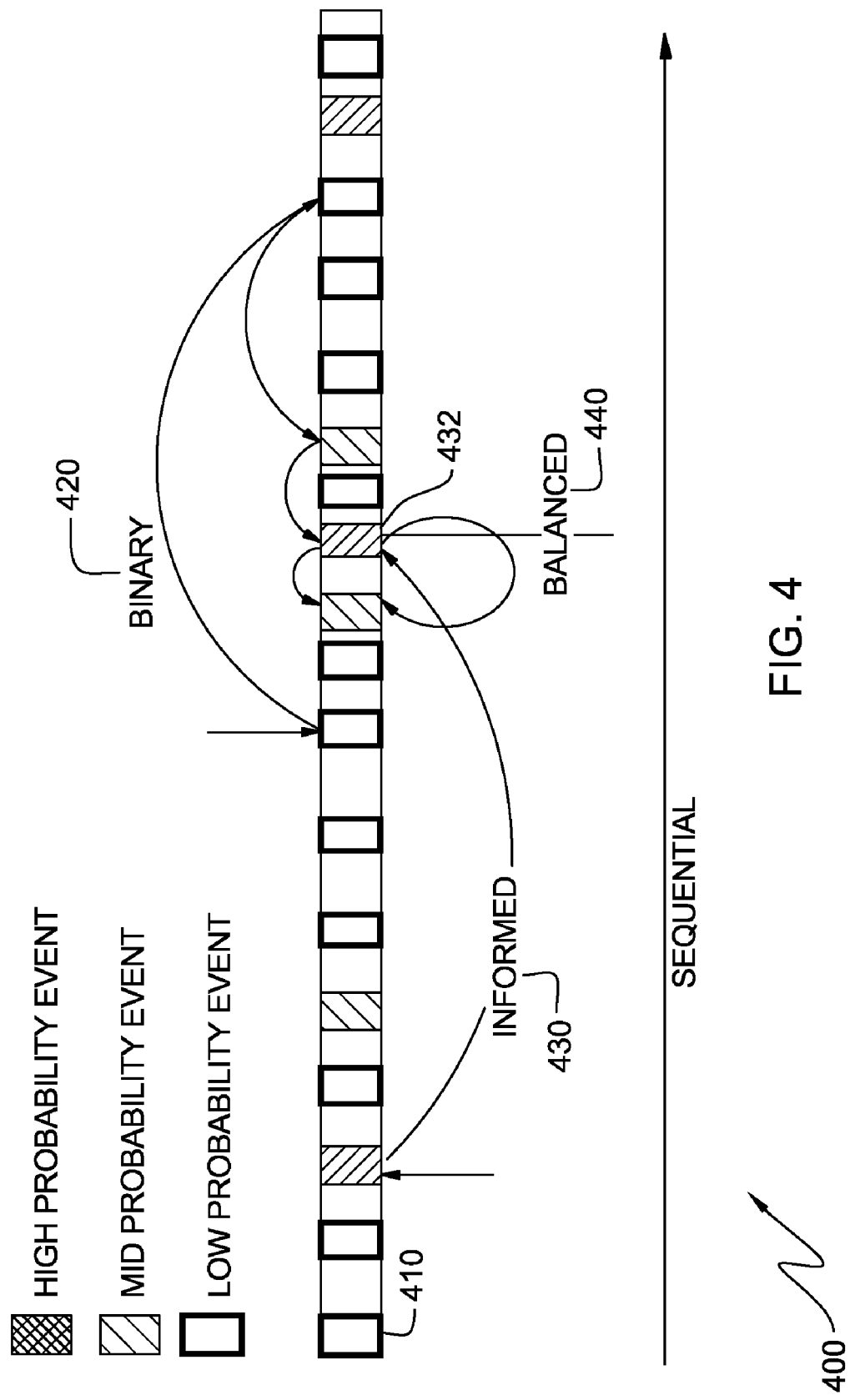
FIG. 4 is a diagram illustrating a search strategy example.

The sequential checkpoint strategy creates a data image that is clean and incrementally applies CDP logs until the point of corruption is reached. As illustrated in FIG. 4, the sequential checkpoint strategy 400 starts from the first clean copy of data 410 and applies the CDP logs in a sequential manner. However, such a strategy creates data images that are tested only for timestamps corresponding to the checkpoint records. Hence, the number of integrity tests that must be performed is proportional to the number of checkpoint records NC and not the number of CDP logs N. The worst-case cost of creating the most current clean data image by the sequential checkpoint strategy is given by $$N_c C_t + C_p + NC_L \qquad (5)$$

The binary search strategy 420 uses the observation that corruption errors are not transient in nature and hence, if data is found to be corrupt at any time $T_i$, the data would remain corrupt for all timestamp $T_j > T_i$. This order preservation in corruption testing enables the partitioning of the search space quickly. As illustrated by the arrows of the binary search strategy 420, partitioning a search space into two equal sized partitions leads one to converge to the required point in logarithmic time steps instead of a linear number of steps. Hence, for a search space with $N_c(t)$ checkpoints at any given time t, the timestamp corresponding to the $N_c(t)2^{th}$ checkpoint record is checked for corruption. If the data corresponding to the timestamp is corrupt, corruption is recursively searched for in the timestamps between the $0^{th}$ and $N_c(t)/2^{th}$ checkpoints. If the data is clean, the inspection window is the timestamps between the $N_c(t)/2^{th}$ and the $N_c(t)^{th}$ checkpoint records. Because the inspection window reduces by a factor of 2 after every check, the search would be completed in log $N_c$ steps and the total time (expected as well as worst case) spent in recovery point identification is given by $$\log N_c(C_t + C_p + C_l T_p/2) \qquad (6)$$

The binary search strategy 420 prunes the search space quickly. However, the binary search strategy is oblivious to the probability that a particular checkpoint was the cause of corruption while identifying the timestamp to test for corruption. The next strategy, the informed search strategy 430, uses the probabilities associated with the checkpoint records to decide the next timestamp to examine. At any given time, the informed strategy identifies the checkpoint j (e.g., item 432) that has the highest likelihood ($p_{i,j}$) of having caused the corruption $c_i$. Hence, for cases where data corruption is associated with a rare event, the search may terminate in a constant number of steps (a constant number of timestamps are examined). Further, as long as the probability $p_{i,j}$ of the highest probability checkpoint is uncorrelated with its timestamp, the search reduces the space exponentially and terminates in logarithmic steps. The following result for termination of the informed search is given in Theorem 1.

Theorem 1: the informed search strategy 430 identifies the most recent uncorrupted data in $O(\log N_c(C_t + C_p + C_L T_p/2)$.

Proof: To prove the result for the termination of the informed search strategy 430, it is sufficient to prove that the search is expected to examine only $O(\log N)$ timestamps before it finds the most recent uncorrupted entry. The average cost of testing a given timestamp is given by $C_t + C_p + C_L T_p/2$.

Because the highest probability checkpoint is uncorrelated with its timestamp, each of the N checkpoint records is equally likely to be examined next. Further, if the $i^{th}$ checkpoint is examined, the search space is divided into two partitions, and only one of the partitions is examined after the check. Hence, the recurrence relation for the search method is given by $$T(N) \leq \frac{1}{N}(T(N-1) + T(1) + \ldots + T(i) + T(N-i) + \ldots + T(1) + T(N-1)) \qquad (7)$$

Thus, $T(N) = \log N$ satisfies the recurrence relation. To verify, the right hand side of the equation reduces to $1/N \log N!^2$ if $T(N)$ is replaced by $\log N$. Hence, the methods herein can show that $T(N) < c \log N$ for some constant c i.e., $\dfrac{\log(N!)^2}{N} < c \log N$ i.e., $\log(N!)^2 < cN \log N$
i.e., $\log(N!)^2 < c \log N^N$ which holds for c=2 F by using the fact that $N!^2 > N^N > N!$.

The informed search strategy 430 attempts to find the corruption point quickly by giving greater weight to checkpoints that have a higher probability of having caused the corruption. The binary search strategy 420 aims to prune the space quickly and oblivious to the probabilities associated with the checkpoint records. In the balanced search strategy 440, the ideas of both of the binary search strategy 420 and the informed search strategy 430 are combined to design the optimal search strategy. More specifically, partitioning the space assists quick convergence; and, high probability false positives can lead to convergence in constant steps.

Hence, a checkpoint record is selected that can balance partitioning the space and the probability of the checkpoint record. In order to accomplish this, the embodiments herein formulate precisely the expected running time of a strategy that picks a checkpoint record i for failure j. The expected running time of the strategy is given in terms of the size and probabilities associated with the two partitions L and R.

$$T(N)=P(L)T(|L|)*C_{tot}+P_{i,j}*C_{tot}+P(R)T(|R|)*C_{tot} \quad (8)$$

P(L) and P(R) are the accumulated probabilities of the left and right partitions respectively; and, $C_{tot}$ is the total cost of creating and testing data for any given timestamp.

Using the fact that T(|L|) can be as high as O(log N) in the case where all checkpoint records have equal probabilities, Equation 8 is modified by:

$$T(N)=P(L)\log|L|*C_{tot}+P_{i,j}*C_{tot}+P(R)\log|R|*C_{tot} \quad (9)$$

Hence, the optimal strategy becomes the minimization of the term on the right hand side. The balanced search strategy 440 picks a checkpoint record i at every step, which minimizes Equation 9. The balanced search strategy 440 picks the checkpoint records that (a) are likely to have caused the corruption; and, (b) partition the space into two roughly equal-sized partitions. By the definition of the balanced search strategy 440, the optimal strategy in terms of isolating the recovery point can be verified.

Figure 5:
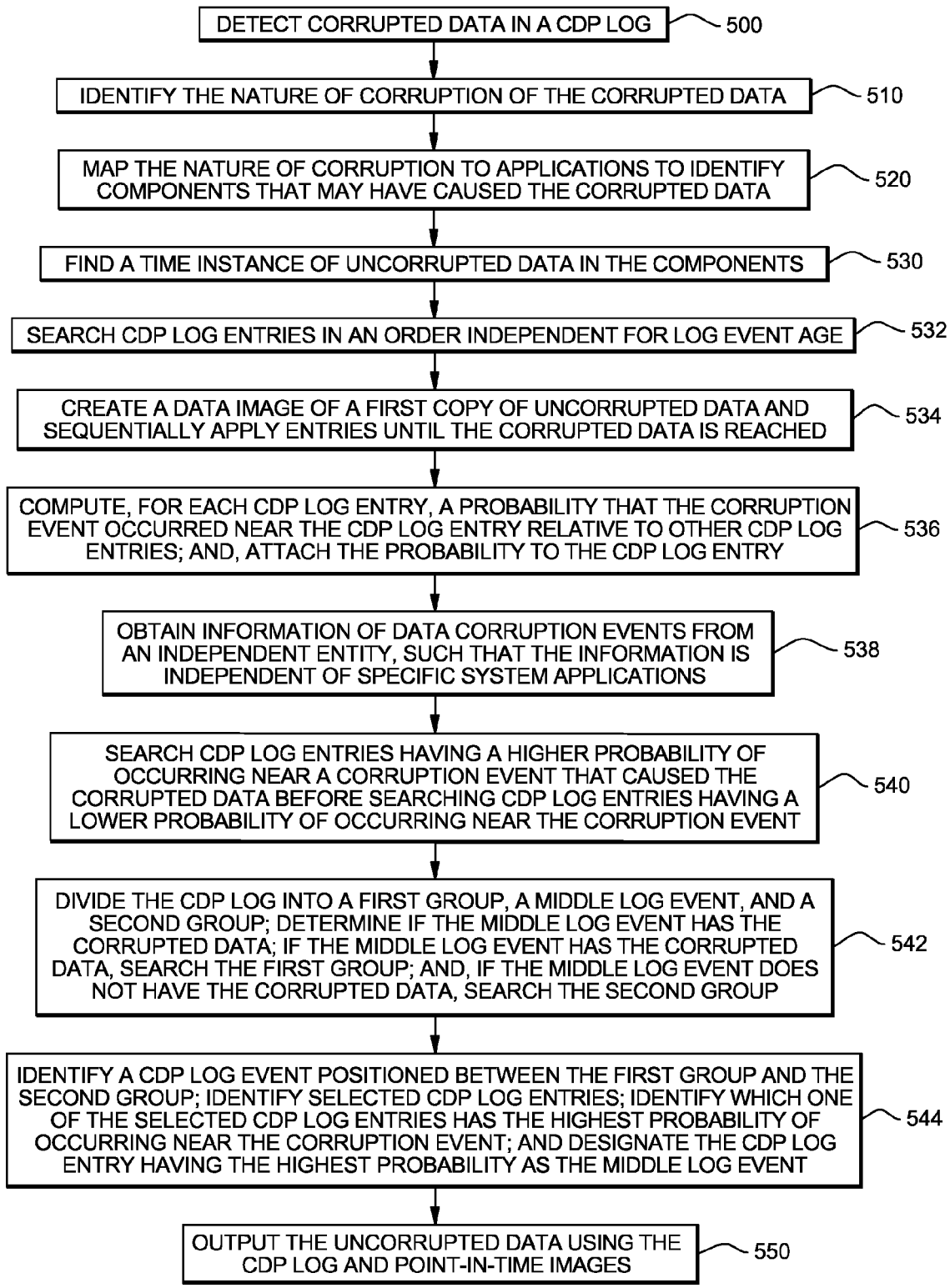
FIG. 5 is a flow diagram illustrating a method of identifying a recovery point in a CDP log.

FIG. 5 illustrates a method of identifying a recovery point in a CDP log. More specifically, the method begins by detecting corrupted data in the CDP log (item 500) and identifying the nature of corruption (item 510). Next, the nature of corruption is mapped to applications to identify components that may have caused the corrupted data (item 520).

The method then finds a time instance of uncorrupted data in the components (item 530). Specifically, this can include searching CDP log entries in an order independent of log event age (item 532). Alternatively, the process of finding the time instance can include creating a data image of a first copy of uncorrupted data and sequentially apply entries of the CDP log until the corrupted data is reached (item 534).

In item 536, the method can compute, for each CDP log entry, a probability that a corruption event that caused the corrupted data occurred near the CDP log entry relative to other CPD log entries. The probability is attached to the CDP log entry. In item 538, the process of attaching the probability can include obtaining information of data corruption events from an independent entity, such that the information is independent of specific system applications. Thus, in item 540, the process of finding the time instance can include searching CDP log entries having a higher probability of occurring near a corruption event before searching CDP log entries having a lower probability of occurring near the corruption event.

In item 542, the process finding the time instance can divide the CDP log into a first group, a middle log event, and a second group. The first group has log entries that are older than the middle log event; and, the second group has log entries that are newer than the middle log event. In item 544, this process of dividing the CDP log can identify a CDP log event positioned between the first group and the second group, such that the first group has an equal size as the second group.

Further, selected CDP log entries are identified by selecting a first predetermined amount of CDP log entries that occur before a CDP log event that is positioned between the first group and the second group, and by selecting a second predetermined amount of the CDP log entries that occur after a CDP log event that is positioned between the first group and the second group. The dividing of the CDP log also identifies which one of the selected CDP log entries has the highest probability of occurring near the corruption event. This CDP log entry having the highest probability is designated as the middle log event.

Following this, the method determines if the middle log event has the corrupted data. If the middle log event has the corrupted data, the first group is searched. If the middle log event does not have the corrupted data, the second group is searched. In item 550, the uncorrupted data is output using the CDP log and point-in-time images are used to construct the uncorrupted data.

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
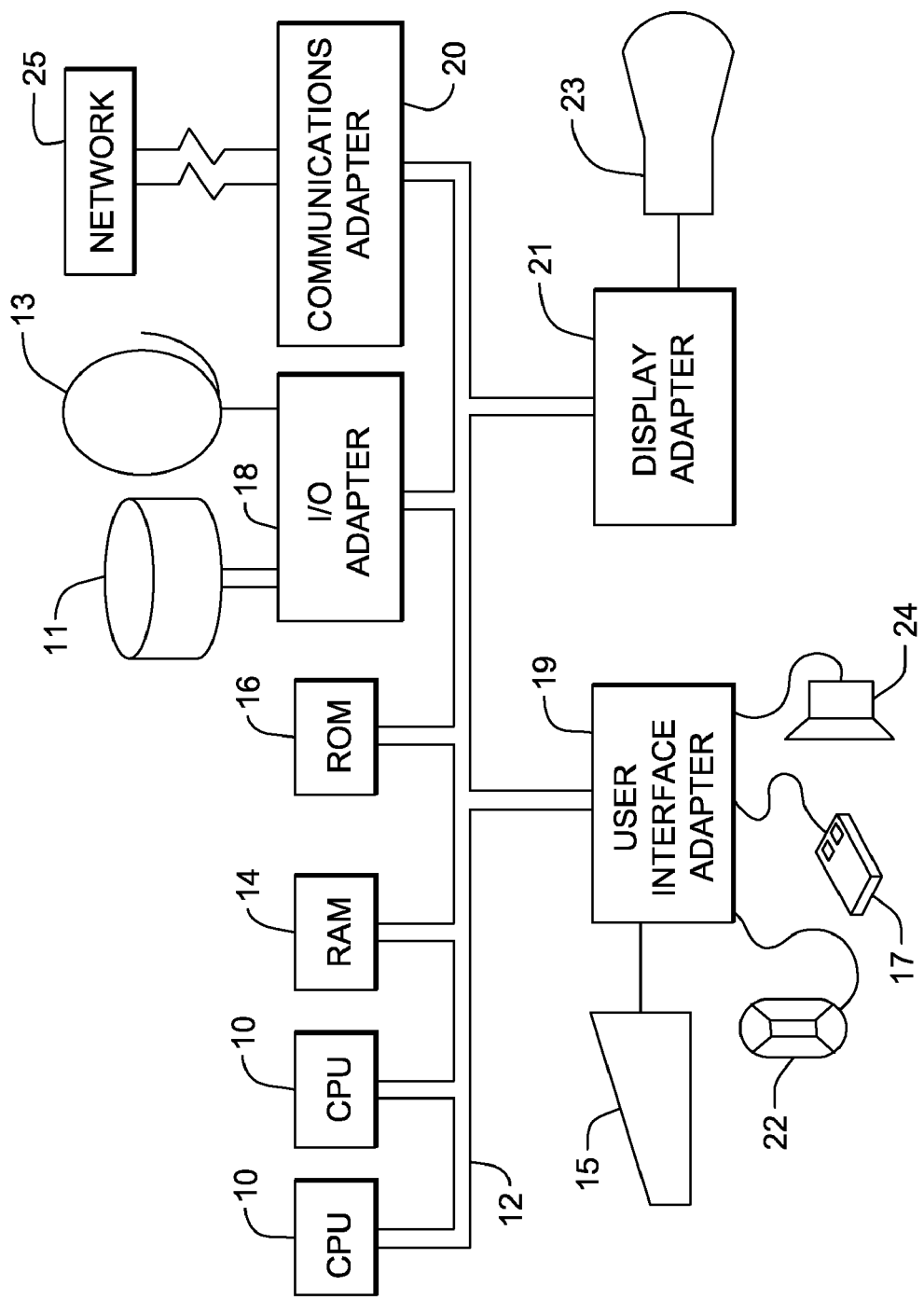
FIG. 6 is a diagram of a program storage device for identifying a recovery point in a CDP log.

A representative hardware environment for practicing the embodiments of the invention is depicted in FIG. 6. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Accordingly, the embodiments of the invention provide an architecture and data scanning methods that quickly identify clean copies of data. The architecture and methods are compatible with existing CDP solutions and are extensible because they allow different applications to customize the process of identifying corrupt data. Moreover, the embodiments herein allow system administrators to decide on the trade-off between data currentness and overall recovery time. By incorporating the architecture and methods into existing CDP solutions, system administrators can cut down the overall recovery time by quickly identifying a clean copy of data. The embodiments herein can reduce the overall recovery time by many orders of magnitude.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A computer-implemented method of identifying a recovery point in a continuous data protection (CDP) log, said method comprising:
   detecting, by a computing device, corrupted data in said CDP log;
   identifying, by said computing device, a nature of corruption of said corrupted data;
   mapping, by said computing device, said nature of corruption to applications to identify components that may have caused said corrupted data, wherein said components comprise logical data stores used by said applications determined from configuration files that configure and deploy said applications, and said logical data stores are mapped to physical storage volumes hosted by storage devices;
   finding, by said computing device, a time instance of uncorrupted data in said components; and
   outputting said uncorrupted data using said CDP log and point-in-time images to construct uncorrupted data,
   where said finding of said time instance includes dividing, by said computing device, said CDP log into a first group, a middle log event, and a second group, wherein said first group comprises log entries of said CDP log that are older than said middle log event, and wherein said second group comprises log entries of said CDP log that are newer than said middle log event.

2. The method according to claim 1, further comprising:
   computing, by said computing device, for each CDP log entry of said CDP log, a probability that a corruption event that caused said corrupted data occurred near said CDP log entry relative to other CPD log entries; and
   attaching, by said computing device, said probability to each said CDP log entry.

3. The method according to claim 2, wherein said attaching of said probability comprises obtaining information of data corruption events from an independent entity, such that said information is independent of specific system applications.

4. The method according to claim 1, wherein said finding of said time instance comprises searching CDP log entries of said CDP log in an order independent of log event age.

5. The method according to claim 1, wherein said finding of said time instance comprises creating a data image of a first copy of uncorrupted data and sequentially applying entries of said CDP log until said corrupted data is reached.

6. The method according to claim 1, wherein said dividing said CDP log into a first group, a middle log event, and a second group, further includes:
   determining if said middle log event comprises said corrupted data,
   if said middle log event comprises said corrupted data, searching said first group, and if said middle log event does not comprise said corrupted data, searching said second group.

7. The method according to claim 6, wherein said dividing of said CDP log comprises:
   identifying a CDP log event of said CDP log positioned between said first group and said second group, such that said first group comprises an equal size as said second group;
   identifying selected CDP log entries of said CDP log, comprising:
      selecting a first predetermined amount of said CDP log entries that occur before said CDP log event positioned between said first group and said second group, and
      selecting a second predetermined amount of said CDP log entries that occur after said CDP log event positioned between said first group and said second group;
   identifying which one of said selected CDP log entries comprises a highest probability of occurring near a corruption event that caused said corrupted data; and
   designating said one of said selected CDP log entries comprising said highest probability as said middle log event.

8. The method according to claim 1, wherein said finding of said time instance comprises searching CDP log entries of said CDP log comprising a higher probability of occurring near a corruption event that caused said corrupted data before searching CDP log entries of said CDP log comprising a lower probability of occurring near said corruption event.

9. A computer-implemented method of identifying a recovery point in a continuous data protection (CDP) log, said method comprising:

detecting, by a computing device, corrupted data in said CDP log;

identifying, by said computing device, a nature of corruption of said corrupted data;

mapping, by said computing device, said nature of corruption to applications to identify components that may have caused said corrupted data, wherein said components comprise logical data stores used by said applications determined from configuration files that configure and deploy said applications, and said logical data stores are mapped to physical storage volumes hosted by storage devices;

finding, by said computing device, a time instance of uncorrupted data in said components, wherein said finding comprises:

creating a data image of a first copy of uncorrupted data and sequentially applying entries of said CDP log until said corrupted data is reached; and dividing, by said computing device, said CDP log into a first group, a middle log event, and a second group, wherein said first group comprises log entries of said CDP log that are older than said middle log event, and wherein said second group comprises log entries of said CDP log that are newer than said middle log event; and outputting said uncorrupted data using said CDP log and point-in-time images to construct uncorrupted data.

10. The method according to claim 9, further comprising:

computing, by said computing device, for each CDP log entry of said CDP log, a probability that a corruption event that caused said corrupted data occurred near said CDP log entry relative to other CPD log entries; and attaching, by said computing device, said probability to each said CDP log entry.

11. The method according to claim 10, wherein said attaching of said probability comprises obtaining information of data corruption events from an independent entity, such that said information is independent of specific system applications.

12. The method according to claim 9, wherein said finding of said time instance comprises searching CDP log entries of said CDP log in an order independent of log event age.

13. A computer-implemented method of identifying a recovery point in a continuous data protection (CDP) log, said method comprising:

detecting, by a computing device, corrupted data in said CDP log;

identifying, by said computing device, a nature of corruption of said corrupted data;

mapping, by said computing device, said nature of corruption to applications to identify components that may have caused said corrupted data, wherein said components comprise logical data stores used by said applications determined from configuration files that configure and deploy said applications, and said logical data stores are mapped to physical storage volumes hosted by storage devices;

finding, by said computing device, a time instance of uncorrupted data in said components, wherein said finding comprises:

dividing, by said computing device, said CDP log into a first group, a middle log event, and a second group, wherein said first group comprises log entries of said CDP log that are older than said middle log event, and wherein said second group comprises log entries of said CDP log that are newer than said middle log event; and determining, by said computing device, if said middle log event comprises said corrupted data, if said middle log event comprises said corrupted data, searching said first group, and if said middle log event does not comprise said corrupted data, searching said second group; and outputting said uncorrupted data using said CDP log and point-in-time images to construct uncorrupted data.

14. The method according to claim 13, further comprising:

computing, for each CDP log entry of said CDP log, a probability that a corruption event that caused said corrupted data occurred near said CDP log entry relative to other CPD log entries; and attaching said probability to each said CDP log entry.

15. The method according to claim 14, wherein said attaching of said probability comprises obtaining information of data corruption events from an independent entity, such that said information is independent of specific system applications.

16. The method according to claim 13, wherein said finding of said time instance comprises searching CDP log entries of said CDP log in an order independent of log event age.

17. A computer storage medium readable by a computer tangibly embodying a program of instructions executable by the computer to perform a method of identifying a recovery point in a continuous data protection (CDP) log, said method comprising:

detecting corrupted data in said CDP log;

identifying a nature of corruption of said corrupted data;

mapping said nature of corruption to applications to identify components that may have caused said corrupted data, wherein said components comprise logical data stores used by said applications determined from configuration files that configure and deploy said applications, and said logical data stores are mapped to physical storage volumes hosted by storage devices;

finding a time instance of uncorrupted data in said components, wherein said finding comprises:

searching CDP log entries of said CDP log comprising a higher probability of occurring near a corruption event that caused said corrupted data before searching CDP log entries of said CDP log comprising a lower probability of occurring near said corruption event;

dividing, by said computing device, said CDP log into a first group, a middle log event, and a second group, wherein said first group comprises log entries of said CDP log that are older than said middle log event, and wherein said second group comprises log entries of said CDP log that are newer than said middle log event; and determining, by said computing device, if said middle log event comprises said corrupted data, if said middle log event comprises said corrupted data, searching said first group, and if said middle log event does not comprise said corrupted data, searching said second group; and outputting said uncorrupted data using said CDP log and point-in-time images to construct uncorrupted data.

18. The program storage device according to claim 17, further comprising:
- computing, for each CDP log entry of said CDP log, a probability that a corruption event that caused said corrupted data occurred near said CDP log entry relative to other CPD log entries; and
- attaching said probability to each said CDP log entry.

19. The program storage device according to claim 18, wherein said attaching of said probability comprises obtaining information of data corruption events from an independent entity, such that said information is independent of specific system applications.

20. The program storage device according to claim 17, wherein said finding of said time instance comprises searching CDP log entries of said CDP log in an order independent of log event age.

* * * * *